United States Patent [19]

Maus et al.

[11] Patent Number: 4,981,634

[45] Date of Patent: Jan. 1, 1991

[54] INJECTION MOLDING PROCESS OPERATING WITHOUT OPENING THE MOLD TO AIRBORNE CONTAMINANTS

[75] Inventors: Steven M. Maus, Henp; George J. Galic, Anoka County, both of Minn.

[73] Assignee: Galic Maus Ventures, Columbia Heights, Minn.

[21] Appl. No.: 355,754

[22] Filed: May 22, 1989

[51] Int. Cl.$^5$ .............................................. B29C 45/40
[52] U.S. Cl. .................................. 264/102; 264/334; 264/335; 425/556; 425/73
[58] Field of Search ................. 264/40.1, 2.2, 102, 264/328.7, 328.8, 328.9, 328.11, 334, 335, 39; 425/73, 553, 554, 555, 556, 808, 810, 436 R, 436 RM, 437

[56] References Cited

U.S. PATENT DOCUMENTS

| | | |
|---|---|---|
| 3,767,342 | 10/1973 | Potter . |
| 3,804,568 | 4/1974 | Rees . |
| 3,910,740 | 10/1975 | Rees . |
| 4,125,247 | 11/1978 | Gabrys . |
| 4,231,987 | 11/1980 | Osawa et al. . |
| 4,364,893 | 12/1982 | Waters .................... 425/73 |
| 4,368,018 | 1/1983 | Rees . |
| 4,438,065 | 3/1984 | Brown . |
| 4,573,900 | 3/1986 | Smith . |
| 4,589,840 | 5/1986 | Schad . |
| 4,627,810 | 12/1986 | Von Holdt . |
| 4,660,801 | 4/1987 | Schad . |
| 4,715,806 | 12/1987 | Ehrler et al. ............... 425/553 |
| 4,740,150 | 4/1988 | Sayer ...................... 264/572 |

FOREIGN PATENT DOCUMENTS

| | | | |
|---|---|---|---|
| 2480667 | 10/1981 | France ................. | 425/556 |
| 57-47612 | 3/1982 | Japan ................. | 425/436 RM |
| 60-40222 | 3/1985 | Japan ................. | 425/73 |

OTHER PUBLICATIONS

Technical Article Entitled "Clean Room Molding: an Attractive Specialty", by D. Stover, in Plastics Machinery & Equipment Magazine, Feb. 1989, pp. 33–37.

*Primary Examiner*—Jill L. Heitbrink

[57] ABSTRACT

An injection molding process creates a micro-cleanroom environment inside a mold cavity which can stay closed to airborne contaminants while ejecting and transferring the molded part out. The molded part is formed and solidified at a parting-line plane within the mold cavity, then is carried rearward on the movable mold insert to a second plane where it is stripped off and transferred out through a discharge aperture which is open when the mold cavity is in the second plane but closed off when in the first plane. The aperture faces substantially downward to prevent entry by upwelling thermal air currents. External supplied filtered gas can provide positive pressure through vents within the moldset's internal space. This maximizes mold and part cleanliness while speeding up "mold-open" cycle; may eliminate HEPA filters/enclosures and robots. Optical disks, lenses, food packaging and medical parts are suggested uses.

13 Claims, 11 Drawing Sheets

INJECTION MOLDING PROCESS OPERATING WITHOUT OPENING THE MOLD TO AIRBORNE CONTAMINANTS

FIELD OF THE INVENTION

This invention relates generally to injection molding plastic articles and more specifically to forming such plastic articles within a mold cavity and ejecting the solidified plastic articles from the mold cavity without opening the mold to airborne contamination.

BACKGROUND OF THE INVENTION

Injection molding processes typically employ molds of a design whereby the molded part is formed in one or more cavities created by at least two mold halves mounted upon the respective stationary and movable platens of the molding machine. The mold cavity thus formed is opened or closed at the parting line junction of the two halves according to a predetermined control sequence of the molding machine and its press cycle.

Typically the press cycle includes a mold-open portion, during which the mold halves open along the plane of the parting line and the molded part or article is removed from the mold's part-forming surfaces. During this mold-open portion of the molding cycle, the molded part or parts are ejected off the mold surface and are alternately either allowed to fall free or, if the molded part is likely to be damaged by such random tumbling action, the part must be grabbed onto either manually (by a press-side operator) or by an automatic part-removal device operating in sequence with the opening and closing portions of the press cycle.

A stack mold is a special case of this conventional injection molding process, in which two parting-lines form respective mold cavities which are operated in coordinated sequence through well-known mechanical linkages (such as rack-and-pinion means). One mold half is mounted upon each of the two machine platens and closing upon a centrally-mounted moldstack having on each of its faces at least one corresponding mold cavity half. So a stack mold functions in the same manner as conventional molds, just with a plurality of opening and closing parting lines.

Certain "white room" injection molding requires greater control over molded-part surface cleanliness and flaws. Examples are dust lodging onto an optical lens molding cavity surface during its open cycle and thus forming a pit flaw on the resulting molded part, or concern over microbiological surface contamination and part cleanliness such as would be the case for food packaging and medical devices or prostheses, especially those implanted surgically into human bodies. Requirements for such "white room" molding revolve around rather expensive clean-air handling systems needed for Class 10,000 down to Class 10 airflows. These classifications correspond to the purity of the air; a Class 10,000 room has 10,000 particles of greater than 0.5 micron diameter per cubic foot of air, the Class 10 only 10 per cubic foot.

In addition, complex part-removal mechanisms with programmable controls and sophisticated end-of-arm tooling are frequently required in order to prevent damage to the part (human operators create unacceptable disruption of clean-room laminar air flows and standards; if people have to remove the part manually from between the mold halves, real cleanliness is impossible). Such automated robotic systems commonly cost $30,000-60,000 per mold and molding machine.

Yet it is not cost alone which the current state-of-arts (see "Clean-room molding: an attractive specialty" article in PLASTICS MACHINERY & EQUIPMENT Magazine, Feb. 1989, pp. 33-37.) in clean-room molding and part removal leaves room for improvement. A very fundamental problem is that the mold surfaces give off substantial quantities of heat on each molding cycle, causing convective air currents which creates a "chimney" effect. Warm air rises off the heated mold surfaces to convectively create a draft which sucks "dirtier" ambient-temperature air with airborne particles and contaminants in from the floor level into the air space between the open mold halves. To try to overcome this, advanced white-room optical or medical molding processes now position fans and blowers into enclosures mounted directly over the mold platens and tie bars, with a steady stream of air blown downward through HEPA filters of specified particle-size distribution. This forced air blast of relatively clean air tries to overcome the upwelling thermal currents of relatively dirty air and hopefully minimize exposure of the mold cavity's part-forming surfaces or the freshly molded part during its part-removal cycle from exposure to such airborne soils and contaminants.

This is an imperfect solution. It is nearly impossible to consistently maintain a dependable laminar air flow of suitable velocity to meet Class 100 clean-room standards in the immediate vicinity of the heated mold surfaces during their opening and closing sequence motions. Looking now at airborne particles of various size distribution, one is reminded that, although gravity is acting upon all the particles, the instantaneous velocities and direction of all particles in motion is not equal. Extremely fine, sub-micron-sized particles exhibit to a very great extent the random patterns of Brownian motion and have very slow overall settling rates or downward velocity. On the other hand, the largest particles, including those sufficiently large to be seen with the unaided human eye (typically, 20-50 microns in size) are acted on proportionately greater by gravity's forces overcoming the counteracting forces. Thus, the larger-sized airborne particles which are most flagrantly optical flaws, for example, are precisely those which have greater settling rates when the predominant air flow is directed downward, such as would be the case where air flow between the mold halves is predominantly from top-to-bottom.

Seeking to block such upwelling thermal air currents has been attempted by shrouding the mold on top and both sides with an accordion-like, fan-folded flexible material. Disadvantages are that it then blocks part-removal robot's access to the open mold, so the part must be dropped freely through the bottomside—which is unacceptable to delicate or scratch-sensitive surfaces of the molded part—and also the fact that the desired high-speed mold opening causes this apparatus to act like a bellows, sucking upward the dirtiest air.

Various conventional means exist for part-ejection systems and part-removal auxiliary robotics. For example, small aperatures in the mold can be made to either suck a vacuum or deliver blasts of compressed air behind the plastic part's interface with the mold surface, to thus aid, respectively, in firstly, the molded part to adhere onto the B mold surface, and secondly, in later stripping action and ejection of the part off of the B mold surface, when these bursts are properly coordinated into the mold-opening process sequence of ejection. Such apparatus is described in U.S. Pat. No. 4,573,900. A somewhat similar apparatus is described in U.S. Pat. No. 4,125,247 at column 5, lines 28-44. Related is the use of compressed gas as driving force to separate the molded part from the mold's partforming surfaces, where the gas enters at a selected point in the mold according to various designs and it is controllably started at the point in the press cycle when the mold is open for ejection. See U.S. Pat. Nos. 4,438,065 and 4,660,801.

Similarly, a variety of suction-cup or mechanical jaws for gripping molded parts are commonly placed onto the end of the arm of various robotic devices which enter the mold when its parting line is open and which attach themselves to the molded part, thus transferring it out of the mold according to a predetermined sequence, coordinated with the mold-opening sequence of the machine. See U.S. Pat. Nos. 4,368,018, 3,804,568, and 3,767,342.

A third way for controlled removal of the molded part is the use of collapsible cores which mechanically eliminate the undercut and corresponding retentive forces exerted by the plastic onto a certain predetermined portion of the mold. Since it is usually desirable to assure that the molded part is successfully transferred off of the stationary mold half (herein referred to as the "A" mold half), and is retained during the initial mold opening phases onto the movable mold half (herein referred to as the "B" mold half), controlled degrees of draft angle on the former and undercut or retention force on the latter is commonly employed. Once this first stage transfer on initial mold opening has been successfully accomplished, these controlled undercut or retention forces can be eliminated by collapsing mechanically these cores through a predetermined mechanism and sequence. An example of such is described in U.S. Pat. No. 4,627,810.

Once freed from the mold's partforming surfaces, the part may be assisted in its removal by gravity by various guide rails (U.S. Pat. Nos. 3,910,740 and 4,231,987) or discharge chutes (U.S. Pat. No. 4,589,840).

However, the elimination of the basic problem of each of these elaborate and costly devices described above has not yet been solved. As long as the mold halves open at the parting line on each of the molding press cycles and thereby expose both the molded part and the mold's partforming surfaces to surrounding contaminated air, and as long as part-removal robotics is required to transfer the resulting molded part out of the open mold halves, costly clean room and robotic equipment will be required for contamination control.

SUMMARY OF THE INVENTION

The present invention discloses and claims an apparatus and method using a moldset operatively disposed within a plastic injection molding machine, within which a mold cavity is formed at a parting line which remains closed throughout normal production press cycles against entry by upwelling thermal convective air currents and the airborne contaminants that are brought with such a "chimney effect". Injection and solidification processes well known to the art are used to form the molded part within the mold cavity. However, transfer of the molded part out of the mold cavity is novel and advantageous, by preventing dirty air from contacting the mold and part surfaces.

A preferred embodiment discloses and claims a mold cavity formed at a parting line which remains completely closed throughout normal production press cycles except for a certain time within the press cycle sequence wherein a molded plastic article formed within the mold cavity is transferred out of the moldset through a downward facing aperture, such that the article leaves the moldset at a point lower than it was when formed within the mold cavity. In no other way is the mold cavity allowed to become opened at the parting line onto the atmosphere during normal press cycles. In additional preferred embodiments, the mold cavity is internally supplied with pressurized filtered gas from an external source, so as to maintain a positive pressure higher than ambient air pressure when the second position is reached, and this downward facing aperture is aligned substantially vertically beneath a molded plastic article ready to be transferred out of the moldset by using gravity drop.

After the plastic has been injected and cooled and when the solidified molded part is ready to be removed, the part is still in a first position wherein the opposing A and B partforming surfaces of the mold cavity are in their relatively closest proximity (a first distance). This first position also corresponds to a first vertical plane formed at the plane of the parting line across which the opposing A and B partforming surfaces face each other, and the opposing A and B partforming surfaces are housed in A and B moldhalf sides of the moldset, which in turn is conventionally clamped within the injection molding machine's stationary and movable platens respectively.

When "mold opening" first starts, the part must predictably stay on either the A or the B partforming surfaces, to always be where ejection will later take place. This requires a positive separation fron one side and a positive retention on the opposing side. Conventionally, this has meant getting the part to grip the B or movable side's partforming surface while releasing off of the stationary or A side. Various means of designed-in retentive forces of the molded part gripping onto a mold insert include mechanical undercuts in the mold surfaces whereon the part is to preferentially grip. A changably settable means which may work in combination with mechanical undercut retention as well as alone is to suck a partial vacuum on the desired retentive side of the mold (commonly but not necessarily the part preferentially grips the part-forming surfaces of the B side mold cavity) while optionally simultaneously blowing compressed air through the mold surface from which preferential separation is desired.

Now, the opposing A and B partforming surfaces can travel controllably to a certain second position (at which point a second distance is established which is greater than the first distance) corresponding to a second vertical plane. At this point, a stripping action is actuated (such as mechanical separating force exerted through ejector pins or stripper rings, with or without auxiliary compressed-air bursts, as well as by such air bursts alone), causing the part now to separate from the one surface upon which it had been gripping, and thus be ejected in the desired sequence and position.

Driving forces for such separation of the molded article from the movable partforming surface include the machine's conventional ejector cylinder and associated ejector assembly, as well as an external supply of clean pressurized gas fed into the moldset through certain passageways therein. Both such means for driving separation can be coordinated to the desired point in the press cycle sequence under the programmed process controller of the injection molding machine, which also is employed to control the motions of the injection and clamping forces of the machine as well. Thereby it can preferably also controllably drive the motions of the movable platen against resilient members within the moldset which then changes its position relative to the stationary platen, which in turn drives the motion from the first position to the second position and back again.

The molded part thus removed from retention is either grabbed by mechanical means, or more preferably, is slid down a guide track by gravity's force, through a downward facing aperture in the moldset, into an external part-collecting device.

The downward facing aperture provides the molded article to exit the moldset lower than the mold cavity within which it was formed (relative to the horizontal centerline of the mold cavity). The aperture opens onto the second vertical plane thereafter can be angled downward at varying slope angles relative to that horizontal centerline, so long as two conditions are met:

1. use gravity, optionally with a guide track or chute used for further discharging the molded part 2. preventing an upwelling thermal air current, or chimney effect, since (importantly) there is no corresponding outlet in the mold cavity perimeter above the horizontal centerline through which the heated air can escape upward and out of the mold cavity. By facing this open aperture substantially downward, any large airborne particles residing therein will predominantly settle out of this opening rather than onto the open mold surfaces because gravitational forces are more dominating upon these larger particles.

A further preferred embodiment combines this downward facing aperture with an internal passageway in the mold cavity for supply of clean filtered air or gas, to provide a positive pressure within the moldset's internal space so as to additionally preclude entry by airborne contaminants from the surrounding environment at atmospheric pressure.

In a preferred embodiment, when the partforming surfaces are in their first, most proximate position just before injection starts, the mold parting line seals off the entire outside perimeter of the mold cavity with massive clamping forces (to prevent the molten plastic from spilling outside the cavity) and thus precludes placement of any stationary simple mechanical devices for "passive" self-guided part removal at the plane of the mold's parting line. However, by transferring the partforming surfaces within the still-enclosed cavity to a second position, the molded article or part can be aligned in a different, second vertical plane from that of the parting line, and the part can then be dropped through the downward facing aperture mentioned earlier into a "passive" device mounted rigidly in this second plane. Such devices are preferred over "active" devices which must be moved in and out of the opening created at the parting line while the mold is open. Such passive devices include lead guides, tracks, or other simple gravity-driven "takeoff" devices which may guide the freshly molded part along with its travel from mold to part-collection racks.

So, unlike conventional molds which eject their molded articles forward of or at the plane of the mold's parting line while open, the preferred molds of the present invention can travel its molded articles to a plane of ejection different from the plane of the parting line, and can thus safely have the previously discussed passive takeoff devices permanently installed onto the appropriate location on the moldset at that point. The cavity sealing function and part ejection function have been placed into two different vertical planes within the preferred moldset of the present invention.

BRIEF DESCRIPTION OF THE DRAWINGS

FIGS. 2A–2E shows in crosssectional horizontal view the detailed workings and locations of those elements which are internal to the moldset, some of which are driven to controlled motion by external elements shown in FIG. 1.

FIGS. 2E, 2A, 2B, 2C, 2D, 3 and 4 all show a first embodiment of the present invention, wherein the method and apparatus within the moldset is used, first, to form by injection molding an optical disk, and, second, to remove this molded optical disk without opening the moldset parting line.

FIGS. 5A and 5B show a second embodiment of the present invention, wherein the method and apparatus within the moldset is used, first, to form by injection molding a medical syringe tube for drug injection, and, second, to remove this molded syringe without opening the moldset parting line.

DETAILED DESCRIPTION OF THE INVENTION

Each of the Figures shows a moldset embodiment of the present invention. As shown in FIG. 1, these various moldset (7) embodiments are operatively disposed between the stationary platen (56) and movable platen (57) of a conventional horizontal injection molding machine (1) equipped with a conventional hydraulic ejector system (6), and the movable platen is driven by a hydraulic cylinder (5) (either directly or indirectly through a mechanical toggle linkage).

The moldset preferrably derives its mechanical motions by rigid linkages to these machine-based driving forces, with a programmable process controller (2) determining the sequences and motions of the conventional screw injection, platen clamping and part ejection functions. These steps are inherent parts of any modern plastic injection molding operation and so these machine functions will be available in many forms to those wishing to practice the present Invention. However, these sequences are most preferably implemented through digital changes in position of these respective elements versus time in a fast-responding, electronic microprocessor control circuit, for highest reproducibility. Furthermore, although a variety of hardware is well known to implement the required motions of clamping, injection and ejection within this sequence, the most preferred driving means are machine-mounted double-acting hydraulic cylinders external to the moldset, which can be controllably moved to the desired position at the desired time as part of the process controller's programmable sequence, in well known ways. Nevertheless, other less preferred alternatives for driving and controlling these motions are contemplated and obvious, such as pancake hydraulic cylinders mounted internal to the moldset itself, triggered off external timer etc., and are therefore mere functional equivalents to the preferred driving means which in no case is at the point of novelty of the present invention.

A source (3) of pressurized air filtered to the desired purity would be made available into the moldset through conventional plumbing, and typically is generated through a well known combination of compressor pump and accumulating reservoir with an in-line depth filter plus final micron-sized filter. Alternatives such as commercial cylinders of gases like dry filtered nitrogen gas are also available. Pressure must be high enough over atmospheric to always assure that only the filtered gas enters into the moldset (i.e. to maintain a positive pressure relative to the surrounding atmosphere) whenever the mold cavity is not sealed off from the surrounding atmosphere.

Figure 1A:
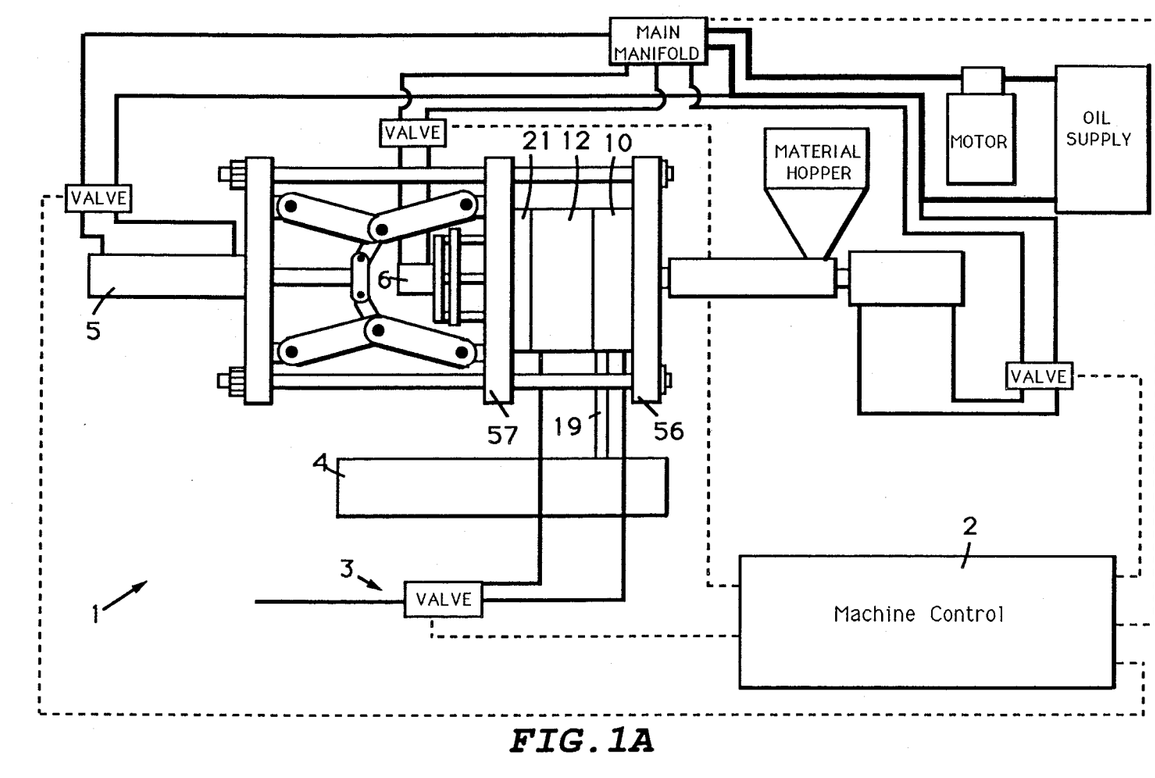
FIG. 1A shows by block diagram the functional relationships between those elements of the present Invention which are not internal to the moldset and which includes those elements providing the controlled driving force as required by this method. These driving forces are individually well known to the art and thus are shown without detail.
Figure 1B:
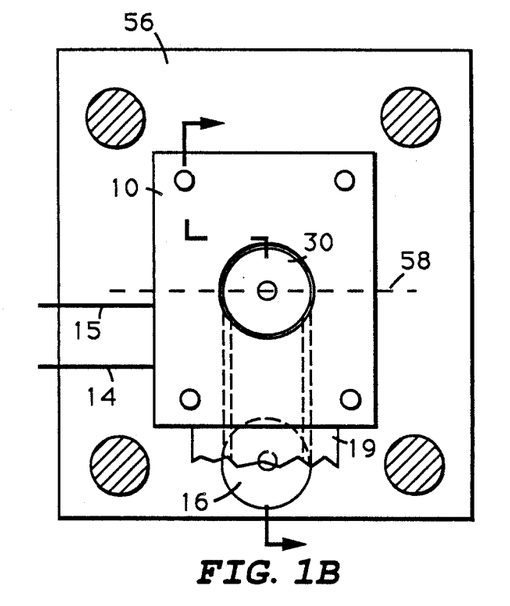
FIG. 1B is a plan view looking into the plane of the moldset's parting line, further showing these functional relationships, and indicating the location of the crossectional view for all subsequent Figures.
Figure 1C:
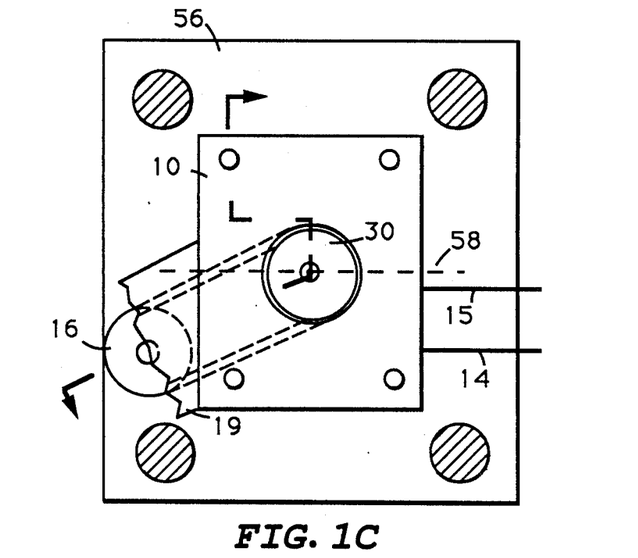
FIG. 1C is a plan view looking into the plane of the moldset's parting line, further showing these functional relationships, and indicating the location of the crossectional view for all subsequent Figures. It differs from FIG. 1B in that the downward facing aperture doesn't just free-drop the part at 90 degrees, but instead guides the part down a ramp at a smaller slope angle relative to the horizontal centerline (58) of the mold cavity.

As molded articles are first formed in the moldset and then ejected through, preferably, downward facing apertures such that the article exits the moldset lower than it was within the mold cavity (relative to horizontal centerline (58) shown in FIG. 1B and 1C), these molded articles are transferred by gravity means and collected (4) as product. Product handling external to the moldset can be as simple as a gravity-fed chute into a shipping box or can be as complicated as a shrouded indexing conveyor feeding into a cartridge carrier. In either case, much of the positive pressured gas fed into the moldset by supply source (3) should preferrably exit the moldset through the same aperture and chutes or conveyors, thus purging these passages of airborne contaminants as well. The molded articles then are finally collected, such as into cartridges, racks, spindles or boxes, for further assembly or processing, or inspection and shipment. As shown in FIGS. 1B and 1C, the angulation of the downward facing aperture can be varied by design from a simple 90 degree "free-drop" path for the part to exit the moldset (shown in FIG. 1B) or a ramp of a certain slope can be used to guide the part as it is slid or rolled by gravity to exit the moldset (shown in FIG. 1C).

Figure 2A:
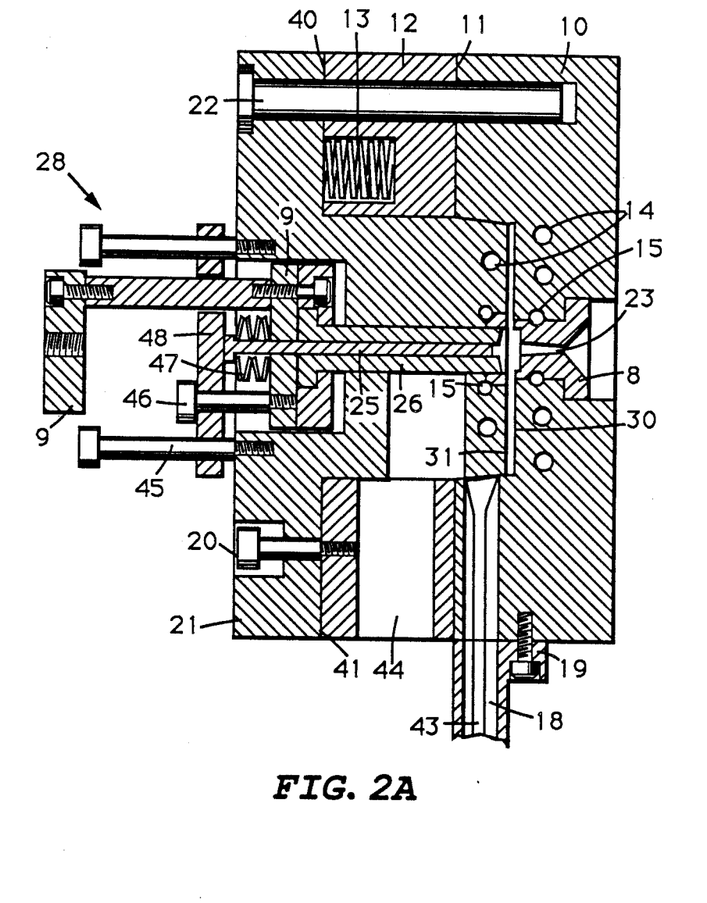
FIG. 2A shows in a crossectional horizontal view the step in the method wherein the empty mold is ready for injection of plastic melt.
Figure 2B:
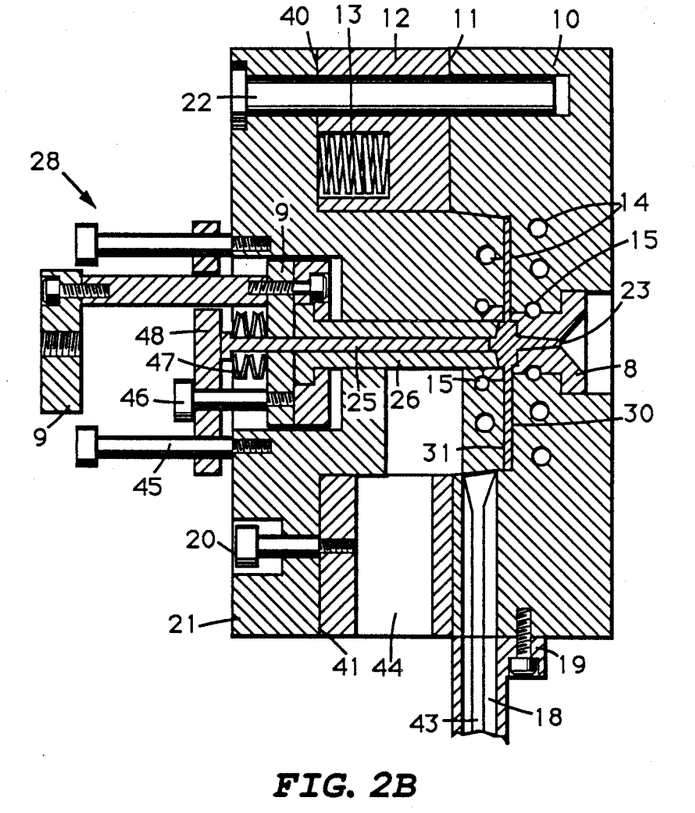
FIG. 2B shows in a crossectional horizontal view the step in the method wherein the molded optical disk (16) has already been formed on the moldset's partforming surfaces ((30) and (31)) but before it is ejected nor has sprue (24) yet been cut from the disk.
Figure 2C:
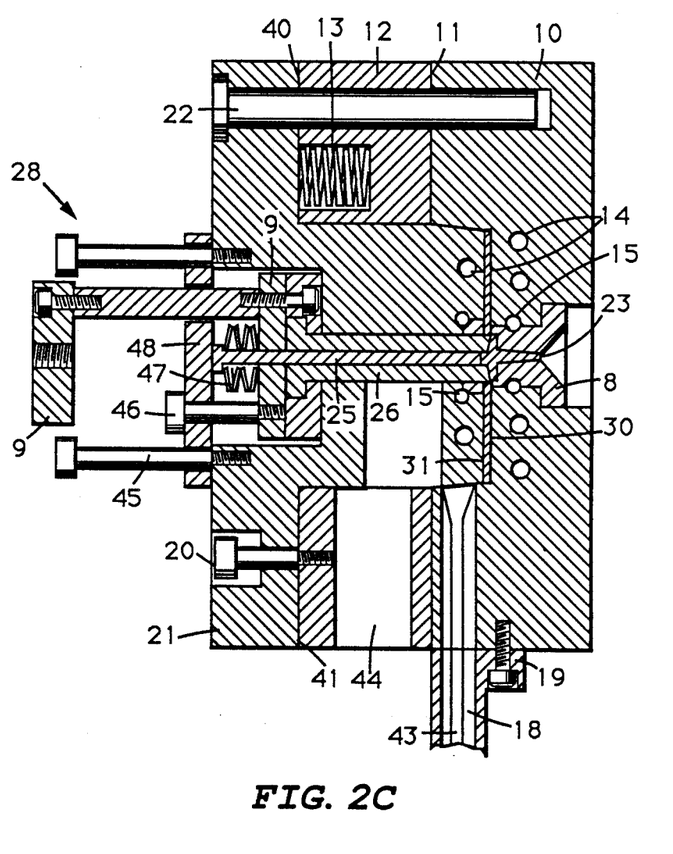
FIG. 2C shows in a crossectional horizontal view the step in the method wherein the molded optical disk has already been formed on the moldset's partforming surfaces but before it is ejected, and sprue has been just cut from the disk but not yet ejected.
Figure 2D:
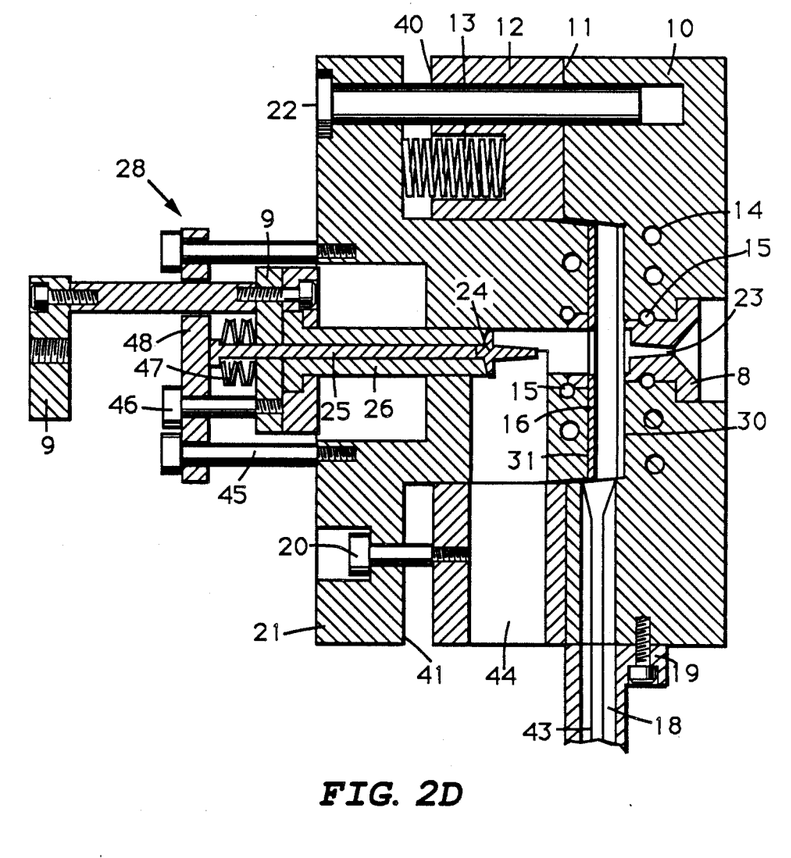
FIG. 2D shows in a crossectional horizontal view the step in the method wherein the molded optical disk has already been formed on the moldset's partforming surfaces but before it is ejected, and sprue has been just cut from the disk but not yet ejected, and both the disk and the sprue have been carried away from the stationary half to the desired position where their subsequent ejection from the moldset can soon take place (as shown in FIG. 2D).
Figure 2E:
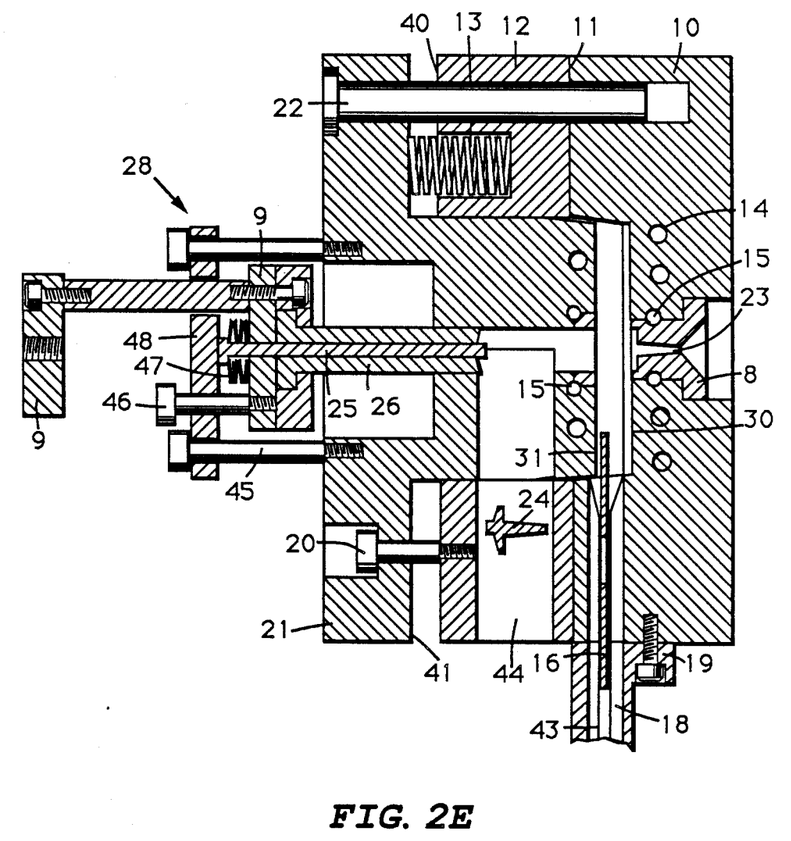
FIG. 2E shows in a crossectional horizontal view the step in the method wherein the molded optical disk has already been ejected off of the moldset's partforming surfaces and is being dropped by gravity through downward facing aperture, and sprue has also been cut from the disk and is also being dropped out of the moldset.
Figure 3:
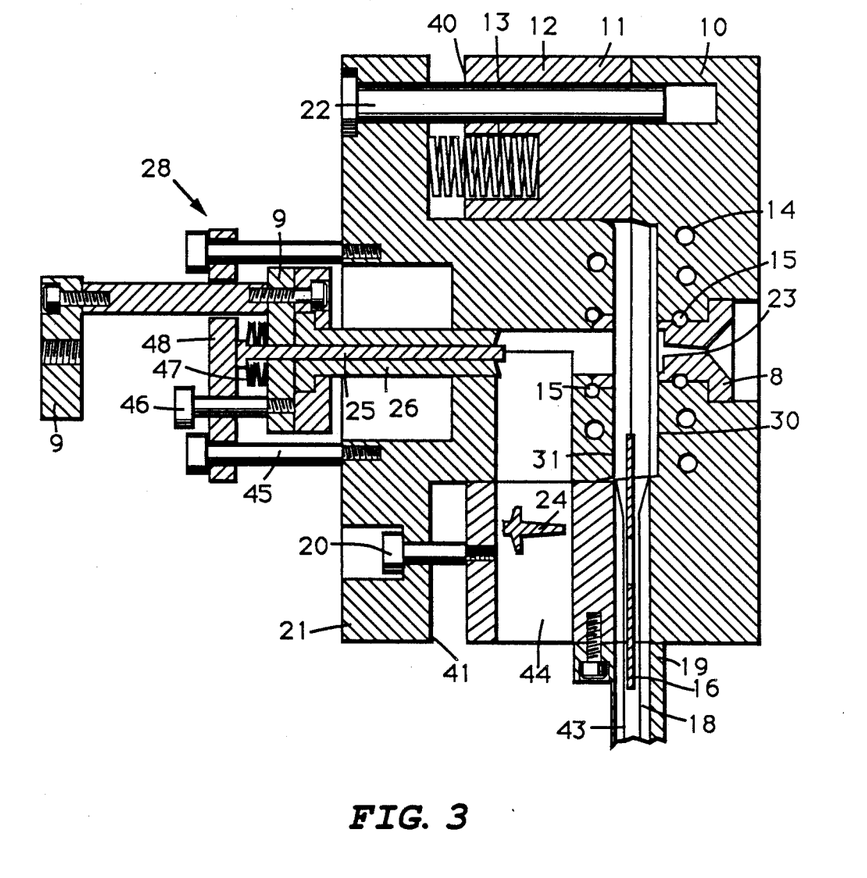
FIG. 3 shows in a crosssectional horizontal view a different way to achieve the same step in the method shown in FIG. 2, except the downward facing aperture providing for product takeout is now rigidly mounted on the B half or movable side of the parting line (11).
Figure 4:
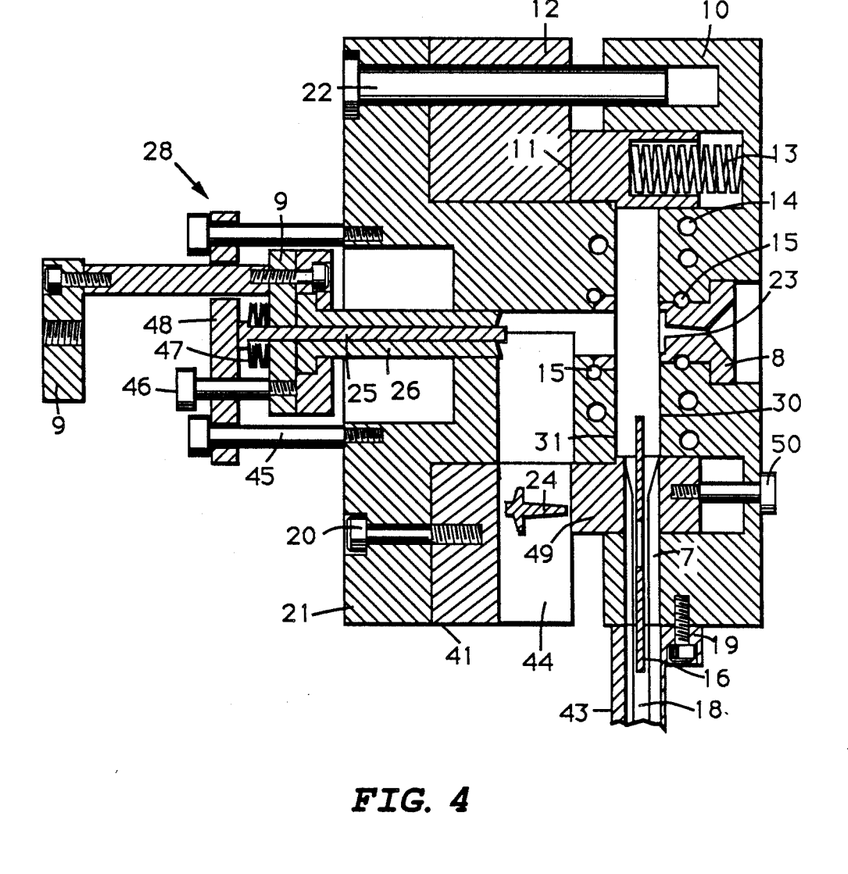
FIG. 4 shows in a crosssectional horizontal view a different way to achieve the same step in the method shown in FIG. 2, except the traveling elements (with relative motions as described herein) are located now on the A half or stationary side of the parting line.

The first embodiment moldset shown in FIGS. 2-4 is for production of a particular type of optical disk made in very high volumes, a digital audio compact disk, which is ordinarily molded in costly Class 100 clean rooms. The center gated disk (16) must have a center hole punched through it. This punching operation also at the same time cuts free the cold sprue (24), which becomes scrap.

Construction and function of the FIG. 2 moldset may be described relative to the plane of the parting line (11). Any plane is defined by the lines lying within it. In all the FIGS. 2-4, which are crosssectional views of the moldset, the parting line plane lies perpendicular to the view and appears as a line (11). Therefore, in describing the location of other elements of the apparatus, although such terms as "to the right of parting line (11)" may be used, those skilled in the art will recognize that notation is merely an elected choice for display, and layout alternatives such as mirror imaging are encompassed in the disclosure and teachings of the present invention as well.

In FIGS. 2-4, to the right of parting line (11) is the stationary platen ((56) of FIG. 1) of the horizontal injection molding machine, and mounted fixedly to this platen is the A moldhalf side or stationary half of the moldset, with A plate (10) containing conventional circulating liquid coolant channels (14) and gas passageways (15) which on one end are connected into the cavity by means of precisely cut venting paths too small to permit molten plastic to flow in but large enough to allow free flow of gas when either blowing into or sucking out of the mold cavity and connected on the other end with the external supply of filtered pressurized air. The A plate also houses a sprue opening (23), through which plastic melt is transferred from the molding machine nozzle (not shown) into the mold cavity, and housing also A side partforming surface (30).

To the left of the parting line is the B moldhalf side or movable half, with major elements being the B plate (12) and B clamp plate (21) (which is fixedly mounted onto the movable platen (57) of FIG. 1), housing B side partforming surface (31) containing conventional circulating liquid coolant channels (14) and gas passageways (15) which on one end are connected into the cavity by means of precisely cut venting paths too small to permit molten plastic to flow in but large enough to allow free flow of gas when either blowing into or sucking out of the mold cavity and connected on the other end with the external supply of filtered pressurized air. These two B plates are maintained in proper alignment by leader pin (22), which also continues across the parting line (11) to assure alignment of the B plates with A plate (10).

Let us designate the plane of the parting line between the (stationary) "A" and (movable) "B" moldhalf sides as an X-Y coordinate plane, as mounted into the horizontal molding machine of FIG. 1. Then let us designate the Z axis perpendicular to this X-Y plane, and motions of the "B" mold partforming surface (31) traveling along this Z axis are preferably driven by the motions of the injection molding machine's movable platen (as shown in FIG. 1), which in turn operates under the control of the process controller. A less preferred embodiment is to drive these equivalent motions with an auxillary hydraulic cylinder mounted within the moldset or onto one of the molding machine platens.

Relative Z axis motion of the B plate (12) with respect to B clamp plate (21), with the A plate (10) remaining stationary throughout, therefore translates directly into a corresponding motion of the B side partforming surface (31) with respect to A side partforming surface (30). This relative Z axis motion of the B plate (12) with respect to B clamp plate (21) is settably limited in its forward direction (to the right side of FIG. 1) by the movable platen having achieved full clamp lockup (as shown in FIG. 1A), when resilient member (13) is sufficiently compressed to allow the B plate's rear surface (40) to seat onto B clamp plate's forward surface (41), and settably limited in its rearward direction (to the left side of FIG. 1) when stripper bolt (20) bottoms out its shoulder within its machined opening within B clamp plate (21) (as is shown in FIG. 2).

Resilient member (13) is shown here as a mechanical coil spring, such as a conventional steel die spring, but functional equivalents would be a hydraulic "pancake" cylinder or an elastomeric polymer of known compressibilities. Its function is to keep B plate (12) in its forward position when the movable platen is moved rearward (such as during ejection) and to thus maintain a closed parting line during all normal production cycles.

Other features of the B mold half include its coolant channels (14) and, preferably, its vacuum/air passageways (15). The latter is in fluid communication with an externally mounted supply ((3) of FIG. 1) of pressurized filtered gas. One commercial product is Mold-Vac (tm) 2000 sold by CAE Services of Bloomingdale, Ill., and runs off ordinary shop air lines. See literature reference. By means of timers or other triggers, it can supply either pressurized air or a partial vacuum (generated through Venturi effect) to the moldset. The gas is most preferrably supplied so that:

1. until the start of the cycle, when the mold cavity is not yet closed off at the aperture, positive pressure is maintained through the passageway from the cavity;
2. when the mold cavity is now closed but before melt is injected, a partial vacuum is sucked through the passageway from the cavity, in order to assist in filling the mold when the molten plastic is injected;
3. after the melt has solidified and the movable mold element (with the molded disk (15) adhering to B side partforming surface (31)) is brought rearward to its second position, ejection of the disk may be done entirely by filtered compressed air blown through the passageway into the cavity (as shown in FIG. 1).

Alternatively, however, ejection can be done entirely by mechanical stripping sleeves or pins driven by auxillary hydraulic or pneumatic cylinder in or associated with the moldset, as is well known in the art. Nor is vacuum assisted venting of the mold cavity before injection filling a requirement for practice of the present Invention. Optionally, pressurized filtered air assists to keep the mold's partforming surfaces relatively cleaner than conventional molds, since preferred embodiments of the present Invention keep the mold cavity closed at the parting line throughout the normal press cycle except for the downward facing apertures. Therefore, the chimney effect of conventional molds is eliminated, since there can be no draft created to circulate dirty air upward.

However, the most preferred embodiments take advantage of these externally supplied pressurized filtered air or gas, used either by itself or a combination of mechanical stripping and air bursts to assist, first, in transferring the part to a rearward position (FIG. 2C) and, second, to eject it (FIG. 2D). After air-assisted ejection, this flow of clean dry air is preferably continued, so as to flush the cavity under positive pressure and thereby prevent "dirty" upwelling warm air laden with airborne particles from entering the downward-facing apertures (43) and (44) until after the moldset is in position to again inject plastic melt in FIG. 2 (note the aperture is now sealed off and the mold cavity is closed).

Ejector assembly (28) motions are preferably driven by the injection molding machine's ejector cylinder, under control of its process controller. Alternatively, it may be driven by an auxillary hydraulic cylinder and supply circuit. These driving mechanisms act upon the rigidly-connected centerhole forming assembly (9) of FIG. 2 to cause Z axis travel along bolts (45) and (46), thus bringing the centerhole forming sleeve (26) and sprue ejector pin (25) rearward to the eventual position as shown in FIG. 2D, during which time the sprue (24) is adhered to the end sleeve (26), and at the end of that travel, a forward motion of pin (25) knocks the sprue (24) free, to drop out of the moldset through aperture (44) by gravity as shown. Pin (25) afterward returns to its home position by the return spring (47) force. Note the ejected disk (16) is also dropped into aperature (43) wherein it is guided into and down a track under gravity forces, to a product collection device ((4) in FIG. 1).

Now see FIG. 2A, which pictures the closed parting line moldset with its mold cavity empty and ready for melt to be injected. See also ejector assembly (28) in a first position, more forward than that second position shown in FIG. 2D, but ejector plate (48) is not yet in contact with the back of B clamp plate (21). Note that at this first position, the downward-facing aperature (43) is shut off, and any air contained therein is not in fluid communication with the mold cavity. There are alternate means for removing the sprue, including the possibility of not even forming a solid sprue at all, by means (not shown) of a heated sprue bushing maintained at a temperature above the solidification point of the thermoplastic, as is well known to those skilled in the art.

Note the A side partforming surface (30) and B side partforming surface (31) are separated by a distance determined by the mechanical limits of the moldset (note there is zero clearance between surfaces (40) and (41) of FIG. 2D). The example shows a conventional injection molding process with a fixed volume cavity, but it should be noted that various types of injection-compression hybrid processes using variable volume cavities may also be advantagously used. Examples of such processes include applicants' U.S. Pat. No. 4,828,769 of the original application Ser. No. 860,006 (hereby incorporated by reference), U.S. Pat. No. 4,364,878 (Laliberte), U.S. Pat. No. 4,540,534 (Grendol), and U.S. Pat. No. 4,091,057 (Weber). All have in common that the separating distance between the A and B partforming surfaces can be controllably changeable during the partformation steps of their molding processes, all of which also combine injection with compression.

In each case, the cycle is started when the molten plastic enters the moldset from the injection molding machine's nozzle (not shown) via sprue opening (23). The plastic fills and packs the mold cavity as shown in FIG. 2B; there are no other changes from FIG. 2A.

Next, in FIG. 2C, at a predesignated time (preferrably before the molded disk (16) plastic has solidified but alternatively after it has solidified), the ejector assembly is driven further forward, to a third position, wherein the ejector plate (48) makes contact against the back of B clamp plate (21) and sleeve (25) is thereby driven forward to seat against a mating surface provided within A plate (10). If done according to the preferred mode (before the disk is fully solidified), this accomplishes 2 things:

1. it mechanically seals the mold cavity from further entry or exit of melt, just like a conventional core ring valve gate would function.

2. it thereby cuts through the unsolidified melt to form the center hole in the disk (15). The cutting of the center hole can be accomplished after solidification also, but greater force is needed and the smoothness of the cut may be worse.

Once the molded part is sufficiently solidified and/or cooled to be able to resist distortion of shape by the ejection forces placed upon it, the molding machine's process controller sequence starts to move rearward the movable platen (to the left) to which is attached those parts of the B half of the moldset as shown in FIG. 2D, thus bringing with it the disk and sprue. Most preferrably, this step of transferring the molded disk off the A side partforming surface (30) is assisted by blowing pressurized filtered air through A side vents, while simultaneously sucking a partial vacuum on the B side partforming surface (31) through vent (15). Also in FIG. 2D, as the movable platen and its ejector assembly (28) travels rearward (to the left), the molded disk (15) can be made to stay onto the B side and away from the A side by controlled means of mechanical interference retention, as well known to the art (such as sufficient drafting of the A side and sufficient undercuts of the B side, although most preferably the combination of vacuum retention and air burst is used to assist transfer).

FIG. 2E shows the disk after being transported rearward to its second position, at which point, part-stripping sequences are engaged to permit the molded part to free itself from the mold insert (preferably assisted by air blowoff as described earlier) and to controllably drop into the guide-rail-track system.

Alternatively, at that point, the molded disk can be mechanically grabbed by a robotic or cam-driven arm device with suction cups, jaws, etc., and other means well-known to the part-removal art. The former means of part removal, simply allowing gravity to apply its force and merely providing a guiding-track means is obviously preferred for its simplicity and lower cost.

FIG. 3 shows in a crossectional horizontal view a different way to achieve the same step in the method shown in FIG. 2, except the downward facing aperture providing for product takeout is now rigidly mounted on the B half or movable side of the parting line (11).

FIG. 4 shows in a crossectional horizontal view a different way to achieve the same step in the method shown in FIG. 2, except the traveling elements (with relative motions as described herein) are located now on the A half or stationary side of the parting line (11). FIG. 4 shows an alternative embodiment, wherein the disk removal is through aperture (43), which now "floats" within a normal press cycle with respect to its position relative to A plate (10) but at the end of each cycle the location of the aperture and thereby disk exit position is the same. This contrasts to the FIG. 2 embodiment, where the B side did the traveling. This A side relative motion is accomplished by moving the partforming surfaces (30) and (31) closer or farther apart as they travel in the Z axis along spacer blocks (49), and resilient member (13) and an added stripper bolt (50) are placed now into the A side to govern and limit such motion.

Figure 5A:
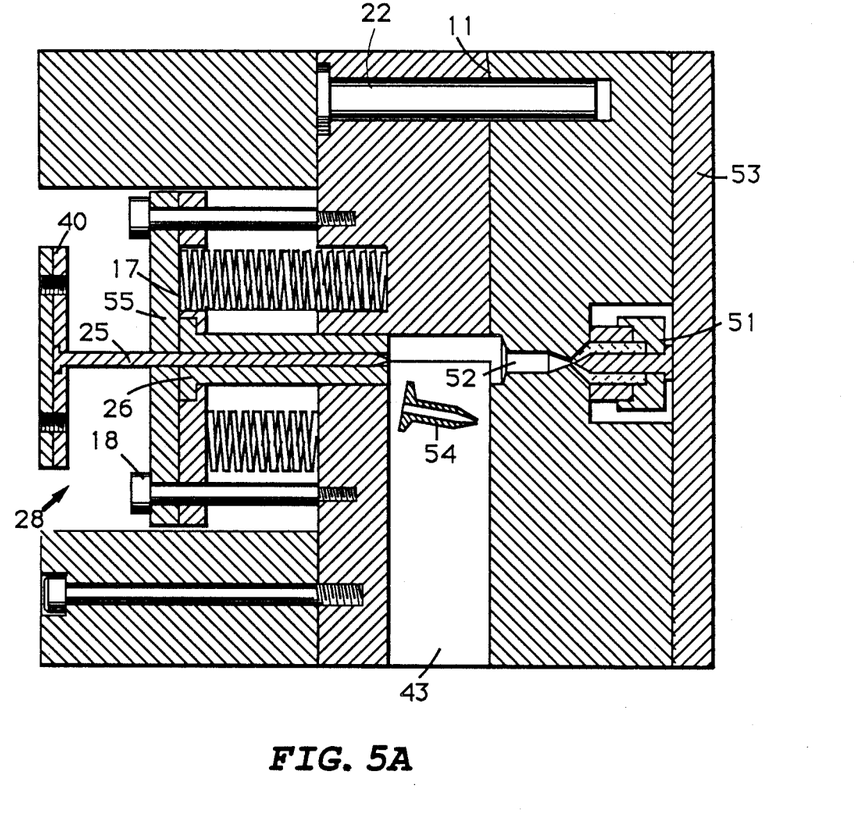
FIG. 5A shows in a crosssectional horizontal view the step in the method wherein the molded syringe (54) has already been ejected off of the moldset's partforming surfaces (24) and (52) and is being dropped by gravity through downward facing aperture (43).
Figure 5B:
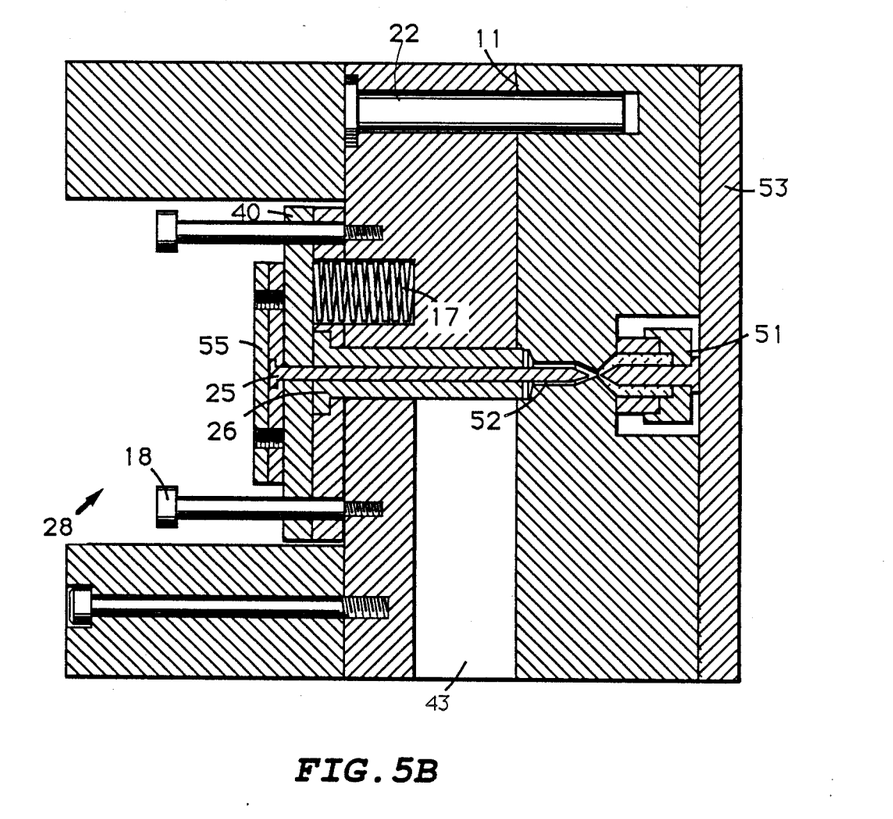
FIG. 5B shows in a crosssectional horizontal view the step in the method wherein the empty syringe mold is ready to for injection of plastic melt.

FIG. 5 features a different example, a medical syringe for injecting drugs, which is typically also a multicavity molding application (though only one mold cavity (52) is shown here with its hot sprue bushing assembly (51), it could be just as easily fed by a heated manifold well known to the art of runnerless molding). Note no sprue is formed, simplifying ejection of syringe (54) through a single downward facing aperture (43), and that the movable platen does not have to move in the ejection of the molded parts, since the cavity-closing and cavity-opening operations are driven by the ejector system of the molding machine.

Most mold elements and functions are identical to the FIG. 2-4 disk example previously discussed, so the same numbers are carried over and only the new elements and functions are now described. The A clamp plate (53) supports the hot sprue bushing assembly (51) which is maintained in continuous fluid communication with the molding machine's nozzle by a conventional melt delivery system (not shown). The previous cycle has just been ended in FIG. 5A, which shows the ejector assembly (28) in its first position (most rearward) as is knockout pin plate (55), and the molded syringe starts to drop out of the moldset.

As shown in FIG. 5B, the next cycle starts with both ejector assembly (28) and knockout pin plate (55) in their third (most forward) position, at which point the mold cavity (52) is enclosed with the ends of sleeve (26) and pin (25) becoming partforming surfaces therein. Then those positions are maintained while melt fills and packs the cavity thus formed. After cooling and solidification, the molded syringe is stripped off the "core"

around which it was formed (pin (25) served as "core") by the greater travel distance of pin (25) compared to sleeve (26), which is accomplished by returning the ejector assembly and knockout pin plate to their first position.

We claim:

1. A method for injection molding plastic articles within a moldset having a mold cavity having A and B sides on either side of a parting line which defines a first vertical plane, with opposing A and B partforming surfaces capable of contollably traveling between a first position and a second position in each molding cycle, and the cavity capable of being controllably supplied internally with pressurized filtered gas at least when in the second position, comprising the steps of:
   a. closing the mold cavity to the first position to seal off an outside perimeter of the cavity from being in fluid communication with air external to the moldset, wherein the opposing A and B partforming surfaces being separated by a first distance;
   b. injecting molten plastic into the closed cavity while in the first position to form a molded plastic article and cooling the molded article until the molded article is solidified;
   c. moving one of the partforming surfaces to a second distance relative to the opposing partforming surface, the movement ending at the second position located at a second vertical plane, the second distance being greater than the first distance, and pressurizing the mold cavity internally with presurized filtered gas at least when the second position is reached, so as to create positive pressure higher than ambient air pressure external to the moldset;
   d. transferring the molded article out of the moldset through an aperture in the mold cavity in the second position, the mold cavity having a closed outside perimeter except for the aperture which is in fluid communication with the ambient air external to the moldset only when in the second position, and through the aperture the pressurized filtered gas is purged out of the moldset to prevent convective air currents external to the mold cavity from contacting the partforming surfaces therein.

2. A method for injection molding plastic articles within a moldset having a mold cavity having A and B sides on either side of a parting line which defines a first vertical plane, with opposing A and B partforming surfaces capable of contollably traveling between a first position and a second position in each molding cycle, comprising the steps of:
   a. closing the mold cavity to the first position to seal off an outside perimeter of the cavity from being in fluid communication with air external to the moldset, wherein the opposing A and B partforming surfaces being separated by a first distance;
   b. injecting molten plastic into the closed cavity while in the first position to form a molded plastic article and cooling the molded article until the molded article is solidified;
   c. moving one of the partforming surfaces to a second distance relative to the opposing partforming surface, the movement ending at the second position located at a second vertical plane, the second distance being greater than the first distance,
   d. transferring the molded article out of the moldset through an aperture in the mold cavity in the second position, the mold cavity having a closed outside perimeter except for the aperture which is in fluid communication with air external to the moldset only when in the second position, and the aperture is downward facing to prevent convective air currents external to the mold cavity from contacting the partforming surfaces therein.

3. A method for injection molding plastic articles within a moldset having a mold cavity having A and B sides on either side of a parting line which defines a first vertical plane, with opposing A and B partforming surfaces capable of contollably traveling between a first position and a second position in each molding cycle, and the cavity capable of being controllably supplied internally with pressurized filtered gas at least when in the second position, comprising the steps of:
   a. closing the mold cavity to the first position to seal off an outside perimeter of the cavity from being in fluid communication with air external to the moldset, wherein the opposing A and B partforming surfaces being separated by a first distance;
   b. injecting molten plastic into the closed cavity while in the first position to form a molded plastic article and cooling the molded article until the molded article is solidified;
   c. moving one of the partforming surfaces to a second distance relative to the opposing partforming surface, the movement ending at the second position located at a second vertical plane, the second distance being greater than the first distance, and pressurizing the mold cavity internally with presurized filtered gas at least when the second position is reached, so as to create positive pressure higher than ambient air pressure external to the moldset;
   d. transferring the molded article out of the moldset through an aperture in the mold cavity in the second position, the mold cavity having a closed outside perimeter except for the aperture which is in fluid communication with the ambient air external to the moldset only when in the second position, and the aperture is downward facing to prevent convective air currents external to the mold cavity from contacting the partforming surfaces therein, and through the downward facing aperture the pressurized filtered gas is purged out of the moldset to prevent convective air currents external to the mold cavity from contacting the partforming surfaces therein.

4. A method of claim 3 wherein gravity is utilized in the step of transferring the molded article out of the moldset, by locating the molded article vertically over the downward facing aperture within the same second plane.

5. A method of claim 3 wherein the molded article adheres to one of the partforming surfaces as the mold cavity moves between the first position and the second position.

6. A method of claim 3 wherein separation of the molded article from its partforming surfaces is assisted by the pressurized filtered gas entering therebetween from a passageway provided within the moldset.

7. A method of claim 3 wherein the mold cavity formed within the moldset is partly evacuated of gases before the injection of the plastic melt has started.

8. A method of claim 3 wherein said pressurized filtered gas continues flowing after the molded article is ejected, whereby the ambient air is prevented from entering the mold cavity through the downward facing aperture.

9. A method of claim 3 wherein the downward facing aperture is suitably shaped to the molded article so as to minimize clearance between the downward facing aperture and the molded article and thus minimize the convective currents air from entering the mold cavity.

10. A method of claim 3 wherein, after the molded article and the one of the partforming surfaces travels together to the second distance, separation of the molded article from its partforming surface is assisted by mechanical separating force exerted through a combination of ejector pin with stripper sleeve.

11. A method of claim 3 wherein transfer of the article out of the moldset by the downward facing aperture is by a gravity-fed guide track into a part-collecting nesting fixture.

12. A method of claim 3 wherein the article is an optical disk.

13. A method of claim 3 wherein the article is a medical device.

* * * * *